Oct. 11, 1960     C. C. CUTLER     2,956,128
HETERODYNE SYSTEMS EMPLOYING TRAINS OF PULSES
Filed Aug. 22, 1951     5 Sheets-Sheet 1
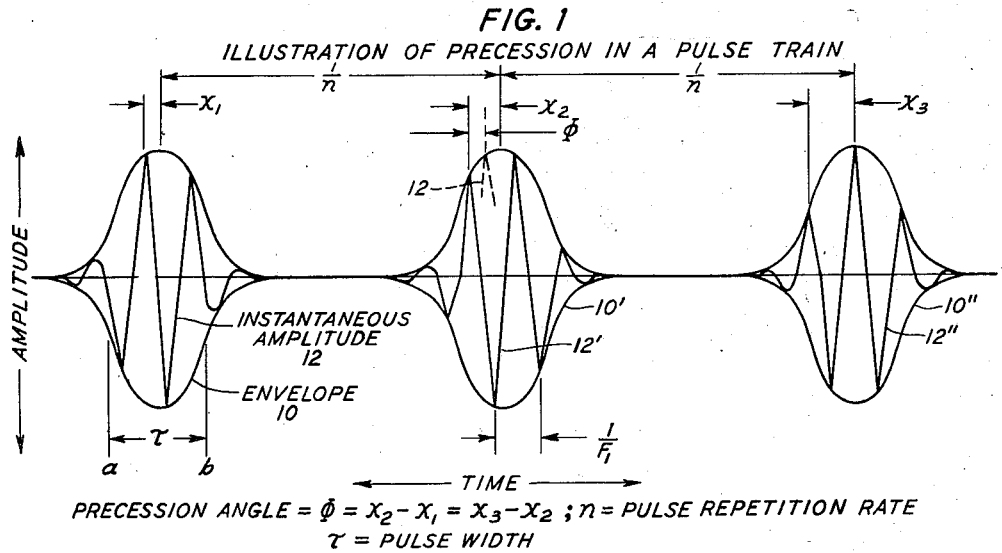
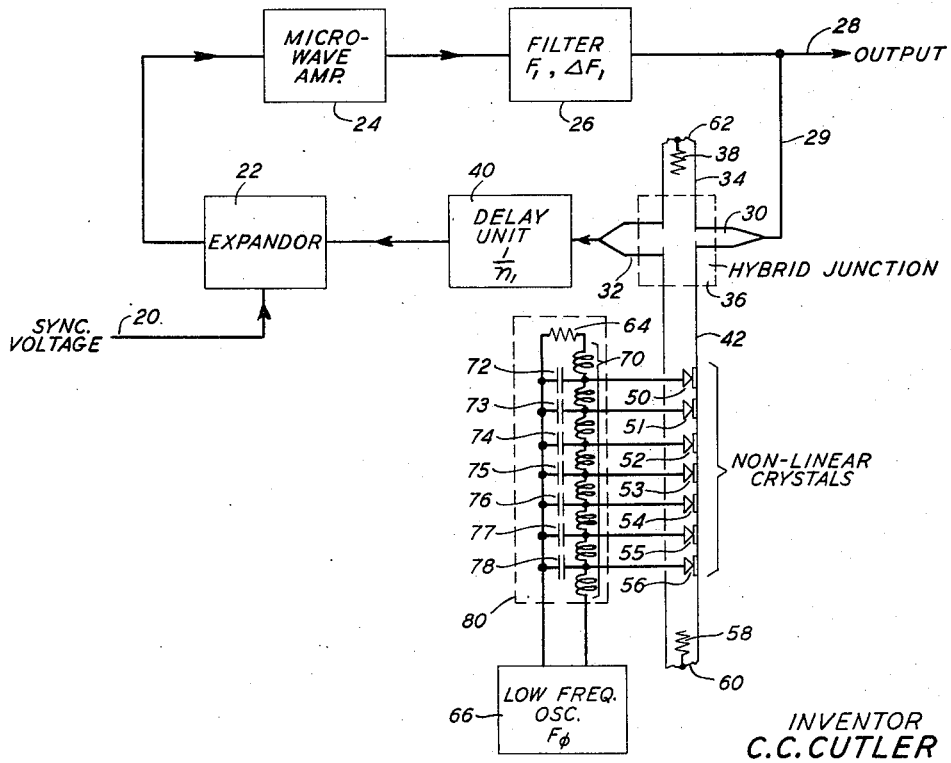
INVENTOR
C. C. CUTLER
BY
H. O. Wright
ATTORNEY

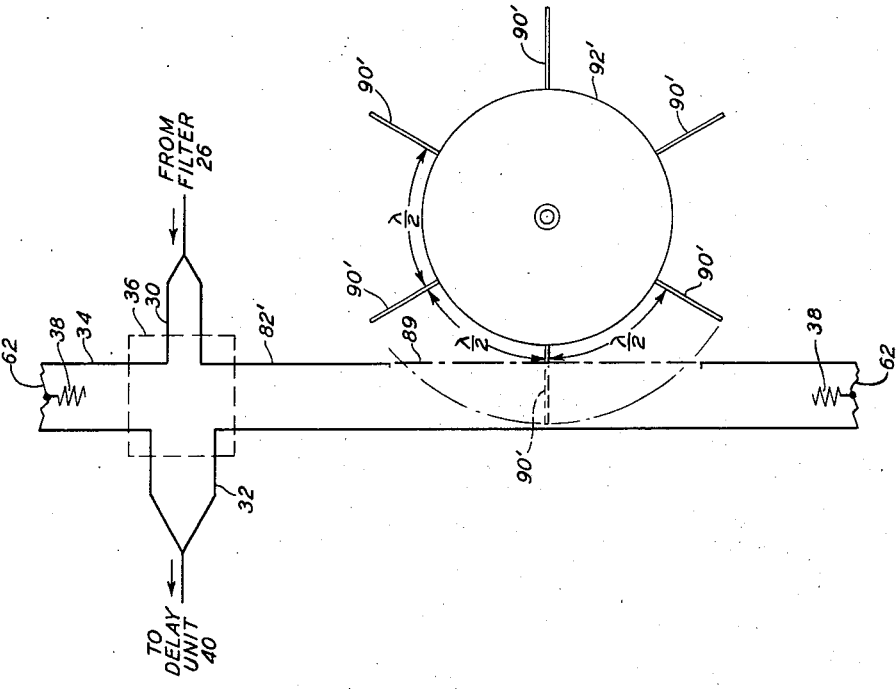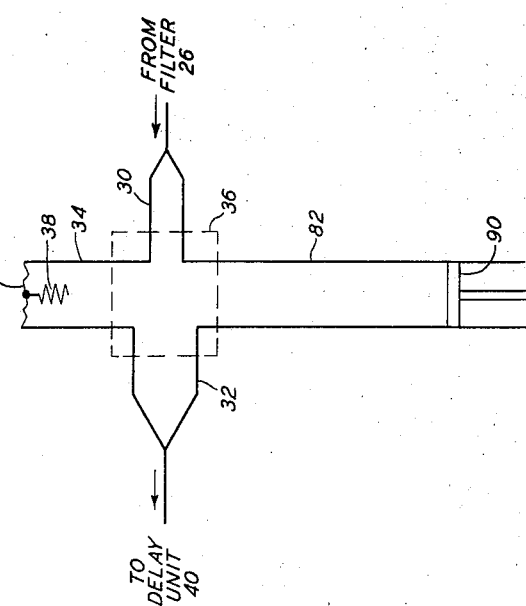

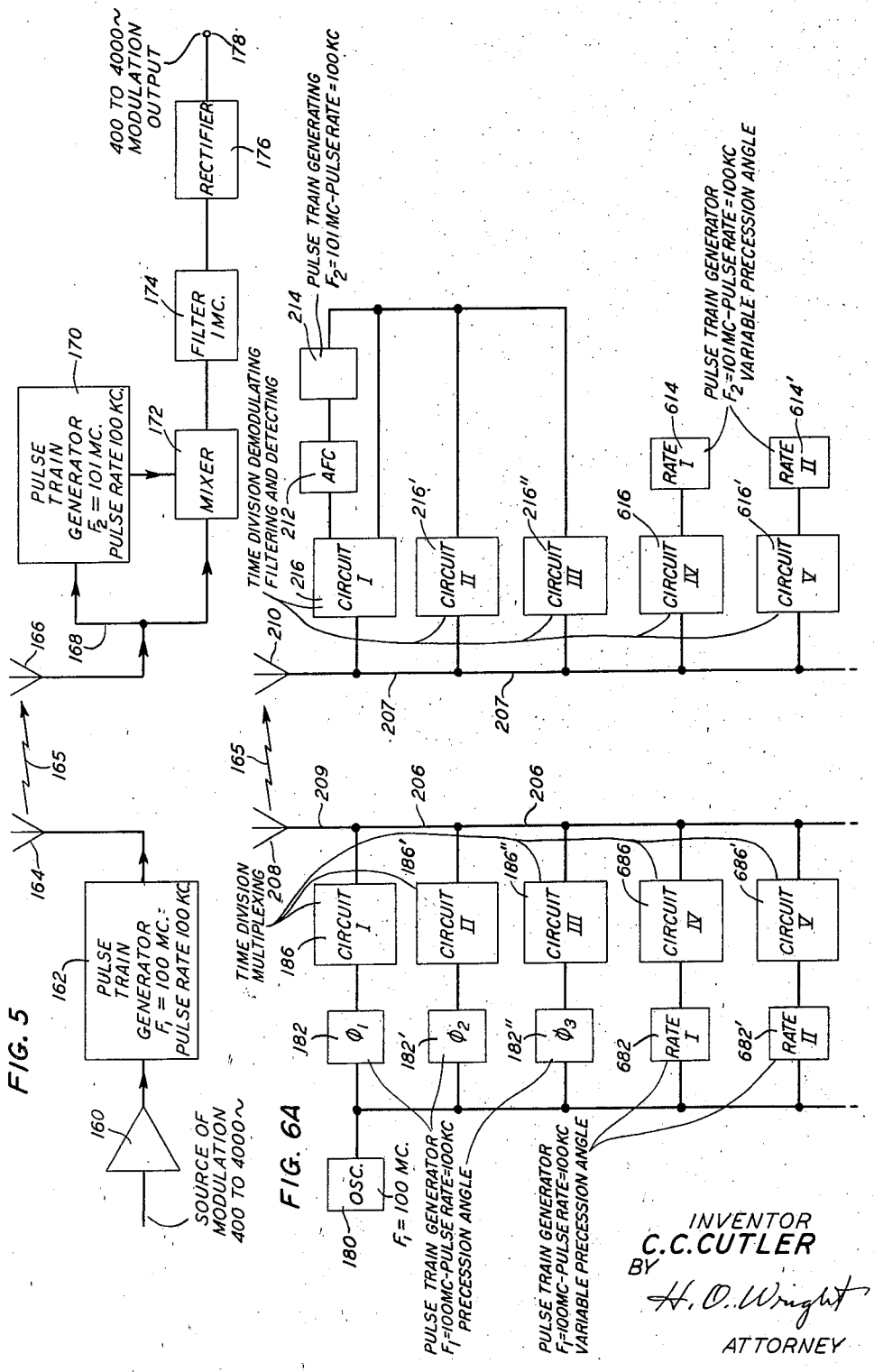

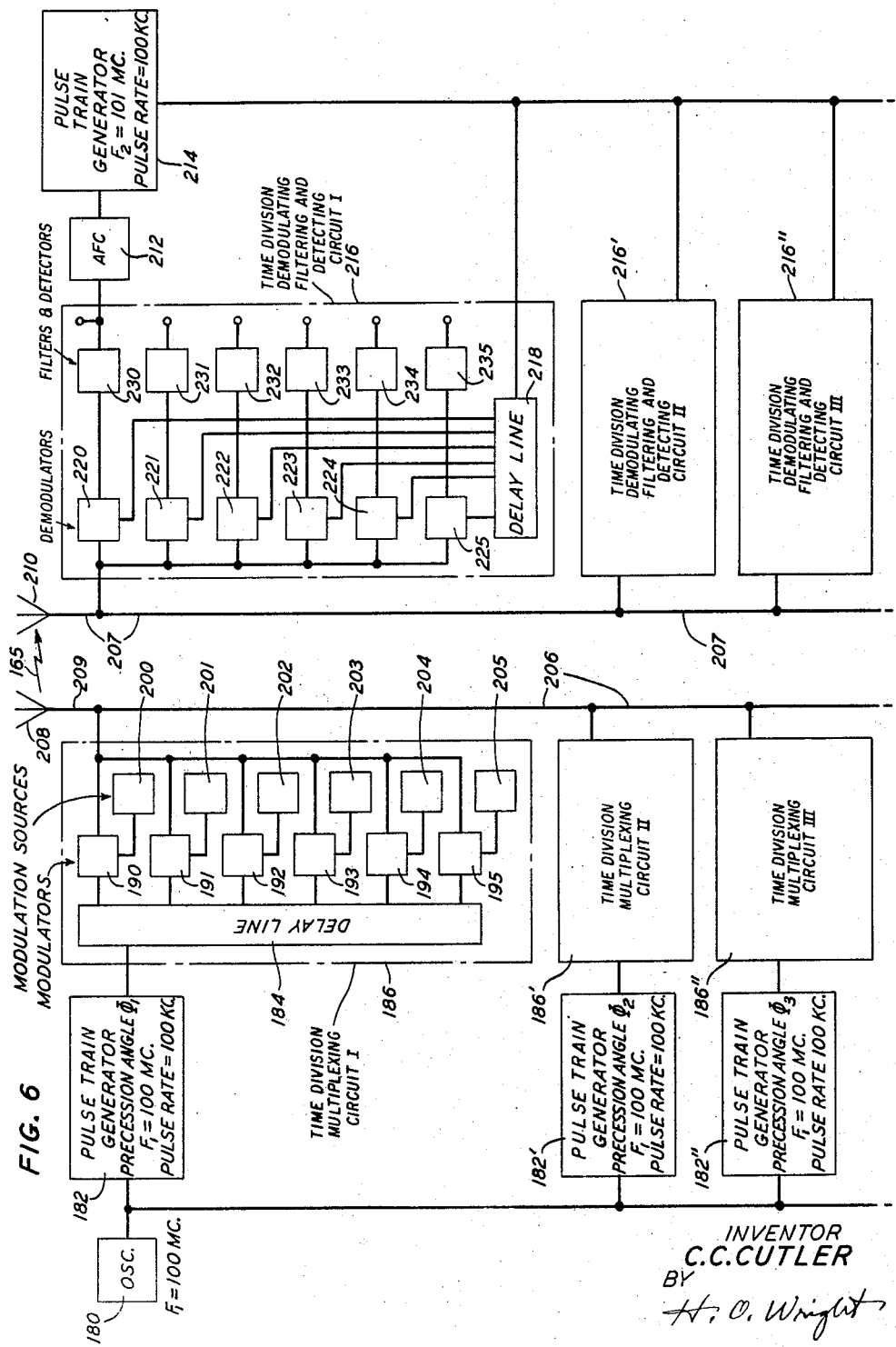

United States Patent Office 2,956,128
Patented Oct. 11, 1960

2,956,128

HETERODYNE SYSTEMS EMPLOYING TRAINS OF PULSES

Cassius C. Cutler, Gillette, N.J., assignor to Bell Telephone Laboratories, Incorporated, New York, N.Y., a corporation of New York Filed Aug. 22, 1951, Ser. No. 243,105

8 Claims. (Cl. 179—15)

This invention relates to electromagnetic wave intelligence transmission systems and more particularly to such systems involving the use of trains of pulses.

A principal object of the invention is to provide new and improved systems utilizing pulses.

Another object is to provide novel and advantageous systems of effecting multiplexing of communication channels.

A further object is to provide improved systems which afford greater precision in resolution and greater freedom from interference and jamming.

Particular systems of the invention make use of the phenomenon that a train of regularly recurrent high frequency pulses, if successive pulses of the train are suitably related, will establish a Fourier frequency spectrum comprising a plurality of discrete frequencies spaced regularly throughout the spectrum, the intervals between the discrete frequencies being substantially devoid of energy and being determined by the pulse repetition rate. The spectrum will be centered about the frequency of the energy of which the pulses are formed, herein designated the "band center frequency," but no discrete frequency need necessarily occur at the center of the spectrum, i.e., at the "band center frequency." Suitable modulation of the pulse train in amplitude, frequency or phase will appear as modulation sidebands of each of the discrete frequencies of the spectrum and may be recovered at the receiver by heterodyning the modulated pulse train with a second unmodulated train of suitably related pulses of the same pulse repetition rate, the pulses of the latter train being synchronized with the pulses of the received signal pulse train, but of a different "band center frequency," chosen to give a train of pulses of a convenient intermediate frequency having spectrum components of relatively narrow frequency band width which are readily filtered out and demodulated.

A first form of a train of suitably related high frequency pulses, for the purposes of the present invention, is one in which the pulses are of the same length, the interpulse intervals are equal and successive pulses of the train are all related to their respective immediately preceding and succeeding pulses by the same phase relationship of the high frequency of which they are formed, i.e., of the "band center" frequency. In other words, if, in possibly the simplest case, for example, a train of regularly recurrent, high frequency identical pulses all start at the same point in a cycle of the high frequency or "band center" frequency, the pulses of the train will be suitably related and have a zero phase shift Φ between the high frequency in each pulse and the high frequency of the next successive pulse of the train. In a more complex case, if each pulse starts at a phase shift of Φ degrees later in a cycle of the "band center" frequency than its immediate predecessor in the train, where Φ can be any number of degrees between zero and 360, so long as it is the same between each pulse and its immediate predecessor in the train, the pulse of the train will still be suitably related for the purposes of the present invention. For each value of Φ a different set of discrete frequencies will appear in the spectrum established by the train of suitably related pulses but the spectrum will remain centered about the "band center" frequency and the spacing between the discrete frequencies will remain the same for all the spectra so long as the pulse repetition rate and pulse length are not changed. If the conditions ideal for the production of a long train of suitably related pulses are closely approached, the train of pulses will be substantially suitably related and the properties of the train will be substantially those described above for a train of suitably related pulses.

By varying the phase shift Φ continuously at a substantially uniform rate which is not too rapid, i.e., which does not exceed the order of $n$ radians per second, where $n$ is the pulse repetition rate, the set of discrete frequencies in the spectrum established by a train of suitably related pulses, as described above, can be made to move or sweep through the spectrum, new frequency components appearing at one end of the spectrum as other discrete frequency components reach the other end of the spectrum and disappear. Thus a train of pulses having a continuously varying interpulse phase shift angle Φ is also a form of train of suitably related pulses for the purposes of the present invention.

The phase shift angle "Φ degrees" from pulse to pulse of any train of suitably related pulses is known as the "precession angle." As discussed above, the precession angle should be constant or continuously varied at a substantially uniform moderate rate, or continuously varied according to a known predetermined law, involving moderate rates of operation.

It will be convenient to refer to a pulse train having precession angle variations as a train of suitably related pulses having a progressively varying phase shift between consecutive pulses. It should be constantly borne in mind that the discrete line frequencies of the spectrum resulting from a train of suitably related pulses having a progressively varying phase shift between consecutive pulses are continuously moving or sweeping through the spectrum.

The above relationships form the basis for a new system of multiplexing, since a plurality of trains of pulses, the pulses of each train being suitably related pulses, all of the pulse trains having the same band center frequency and the same pulse length and pulse repetition rate, but sufficiently different precession angles (either fixed or variable), will not interfere with each other, inasmuch as the discrete frequencies of their respective frequency spectrums will usually be definitely separated in frequency from each other at each particular instant of time. It should be noted, however, that for particular pulse train combinations of two differently variable precession angles, or for the combination of trains of fixed and variable precession angles, there may be instants at which the spectral lines of one pulse train will coincide in frequency with those of the other. Provided this does not occur too frequently, the result will merely be that each will contribute a relatively small amount of noise at such instants of coincidence to the other and for many purposes this will not be objectionable.

A further important and useful feature arising from the above-described relationships is that a train of suitably related pulses having a particular predetermined type of varying precession angle can be readily distinguished from a large number of similar trains of suitably related pulses having the same band center frequency and the same pulse length and pulse repetition rate but different types of varying precession angles. This feature is also of interest in connection with "secrecy" systems, anti-jamming radar systems, systems in which the number of channels is increased in view of the probability that all channels will ordinarily not be in use simultaneously, and the like.

Various specific electromagnetic wave intelligence transmission systems involving the use of one or more of the above-mentioned features, or related features, will be described in detail hereinafter to illustrate the extremely broad scope and utility of the principles of the invention.

Other and further features and objects of the invention will become apparent during the course of the following more complete and detailed description of features of the invention and of illustrative embodiments employing various and sundry methods of applying the principles of the invention, as well as from the appended claims.

In the accompanying drawings:

Fig. 1 is a dragrammatic representation of a group of three pulses, each pulse comprising a plurality of cycles of a high frequency, the group of pulses comprising a portion of a train of pulses having a pulse repetition rate of $n$ pulses per second and a difference in phase between the high frequency in each pulse and the high frequency in the next successive pulse of $\Phi$ degrees, this difference in phase being referred to as the precession angle $\Phi$ of the train of pulses;

Fig. 2 is a block schematic diagram of one form of generator of a train of high frequency pulses suitable for use in certain systems of the invention for which pulse trains having a progressively changing phase relation between the high frequency of successive pulses in the train is desired;

Figs. 2A and 2B are diagrams indicating modifications of a unit used in the generator of Fig. 2 suitable for use in systems of the invention;

Figure 3A:
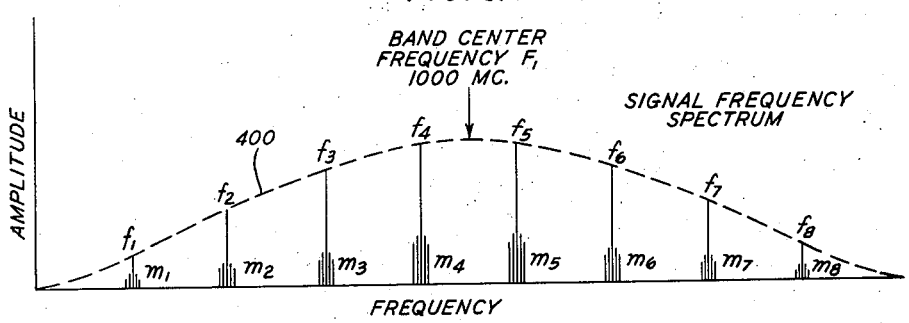
Figs. 3A, 3B and 3C are diagrammatic representations of the three spectra of line frequencies corresponding to the transmitted train of pulses, the heterodyning train of pulses and the intermediate frequency train of pulses, respectively, for a typical system of the invention.

Fig. 5 is an electrical schematic block diagram of a simple over-all single channel communication system of the invention; and Figs. 6 and 6A are electrical schematic block diagrams of more complex over-all multichannel communication systems employing both conventional time division and novel pulse-heterodyne types of frequency division multiplexing made possible by arrangements of the present invention.

In more detail in Fig. 1, envelope curves 10, 10' and 10" and instantaneous amplitude curves 12, 12' and 12" represent, respectively, three successive pulses of a train of suitably related pulses having a precession angle of $\Phi$.

The band center frequency, i.e., the high frequency of the energy of which the pulses are composed, is $F_1$. A cycle of this frequency is therefore, obviously, $$\frac{1}{F_1}$$

The repetition rate of the train of pulses is $n$ pulses per second, whence the interval between corresponding points of successive pulses is $$\frac{1}{n}$$

second. The pulse length is nominally $\tau$ and is usually taken as the distance between points $a$ and $b$ on the pulse envelope 10, for example, which points represent the "half amplitude" points on the envelope as compared with the amplitude at the point of maximum amplitude of the pulse envelope.

In Fig. 2 a regenerative pulse generator circuit, of a type shown and described in my copending application Serial No. 118,889, filed September 30, 1949, is shown. (See particularly Fig. 5 of my copending application.) This application matured as Patent 2,617,930, granted November 11, 1952.

The circuit is essentially a loop circuit containing an amplifier 24, which includes an automatic gain control (not shown), an expander 22, a band pass filter 26, which can be supplied in part, or wholly, by the inherent frequency selective characteristics of the loop circuit, particularly, for example, by the interstage coupling circuits of the amplifier, and a delay circuit 40 (the latter being supplemented, in the present instance, by the circuit including the hybrid T 36, non-linear crystals 50 to 56, inclusive, delay line 80 and low frequency oscillator 66, to be described in detail hereinunder). The circuit is controlled to give unity gain at the peak amplitude of the pulse and is capable of generating a train of pulses each pulse of which is, for example, one milli-microsecond in length. A plus travels around the circuit, alternately being sharpened in the expander and broadened in the filter. The output tap 28 delivers identical pulses recurring at a rate determined by the delay of the complete loop circuit. The four main units (or their equivalents when the distributed characteristics of the specific circuit are considered) i.e., amplifier 24, filter 26, delay unit 40 and expander 22, and the over-all operation of the circuit are described in detail in my above-mentioned copending application.

In order to provide a train of pulses for which the precession angle $\Phi$ will be substantially continuously variable, the delay unit 40 is supplemented by the combination including the wave-guide hybrid T junction 36, one conjugately related pair of arms 30 and 32 of which are employed in the circuit connecting the output of filter 26 to the input of delay unit 40.

A third arm 42 of the hybrid T junction 36 is extended and provided with a plurality of non-linear crystals 50 to 56, inclusive, spaced along the arm at substantially equal intervals corresponding to a small fraction of a wavelength, such as one-eighth wavelength, for example, of the frequency $F_1$, the "band center" frequency for the spectrum, of the train of pulses being formed. Seven crystals are shown, but in practice it may be desirable to use a different number. For example, if delay line 80 is several wavelengths long, then several times eight crystals will be required to make full use of the range of variations which line 80 will provide in such a case, with a crystal spacing of one-eighth wavelength. The far, or lower, end 60 of arm 42 is terminated in its characteristic impedance by a termination 58, which can, for example, be a tapered dielectric member coated or impregnated with carbon particles to provide a suitable resistive impedance, in accordance with principles well known to those skilled in the art. The "negative" terminal of each of the crystals is connected to the far, or right, side of guide 42 and the other terminals are connected to suitably spaced points along the delay line 80, as shown.

Delay line 80 can be a conventional low frequency delay network comprising, for example, a series inductance 70 with a plurality of shunt connected capacitors 72 to 78, inclusive, connected at uniform intervals along inductance 70, as shown, the far, or upper, end of delay line 80 being terminated in its characteristic impedance by resistor 64, the near or lower end of delay line 80 being connected to the output of low frequency oscillator 66, as shown. The frequency $F_\phi$ of the oscillator 66 is chosen to obtain the desired rate of change of precession as defined by the expression.

$$\frac{1}{2\Pi}\frac{d\Phi}{dt} = -F_\Phi \tag{1}$$

The delay line 80 is at least a half wavelength long, and preferably several wavelengths long, measured at frequency $F_\phi$. The successive connection points to delay line 80 for the crystals 50 to 56, inclusive, are the same electrical distance apart measured in line 80 in line wavelengths at frequency $F_\phi$ as when measured in wave guide 42 in guide wavelengths at frequency $F_1$. The connection points of crystals 50 to 56, inclusive, to line 80 therefore are also the same fraction of a wavelength apart (for instance, one-eighth wavelength) in line 80 measured at frequency $F_\phi$ as the crystals are in guide 42, measured at frequency $F_1$.

The over-all result of the arrangement described, is that the phase of the wave reflected from the lower portion of arm 42 is continuously varied in one direction since successive ones of the crystals 50 to 56, inclusive, are sufficiently altered in impedance to give a large reflection, successively, as the wave from low frequency oscillator 66 travels along the delay line 80 and reaches the points on delay line 80 to which the successive crystals are connected, as shown. The above "switching" circuit is similar to that shown in Fig. 4 of United States Patent 2,535,303, granted December 26, 1950, to W. D. Lewis, as will be immediately apparent to those skilled in the art.

The fourth arm 34 of the hybrid T junction 36 is terminated at its upper end 62 by a second terminating device 38 which can be of the same type as device 58, described above. Alternatively, in a more refined embodiment, the fourth arm 34 can be extended and have an identical circuit to that associated with line 42 in order to reinforce the effect of said circuit, in which case an effective gain of six decibels in amplitude at the output 32 of the hybrid junction will be realized and a smoother variation of the precession angle $\Phi$ will be obtained.

In the over-all circuit a portion of the power in the pulses from the output of filter 26 reaches the arm 30 of the hybrid T junction 36. The input energy to arm 30 is divided equally by the junction between arms 34 and 42. The energy entering arm 34, when the circuit as shown in Fig. 2 is used, is absorbed by resistive termination 38.

The power entering arm 42 is reflected by the nearest one of the non-linear crystals 50 to 56, inclusive, which happens to be substantially altered in impedance at that instant by the wave from oscillator 66 traveling along delay line 80. The reflected power pulse leaves the hybrid T junction 36 by arm 32 which connects to the input of delay unit 40. Thus, the loop phase and, consequently, the pulse repetition rate, are determined mainly by delay unit 40, but a continuous variation in the precession angle $\Phi$ of successive pulses is effected by the circuit comprising the combination of the hybrid T junction 36, the crystals 50 to 56, inclusive, the delay line 80 and the low frequency oscillator 66, in the manner described in detail above.

In the event that continuous variation of the precession angle of the train of pulses is not required in the operation of a particular system of the invention, Fig. 2A shows a suitable modification of that portion of the circuit, including the hybrid T junction 36, to facilitate adjustment of the precession angle to a predetermined constant value.

In Fig. 2A the third arm 82 of the junction 36, is provided with a movable short-circuiting plunger 90, provided with a handle 92 by means of which the position of plunger 90 in waveguide arm 82 can readily be adjusted to give, within limits obviously set by the length of arm 82 and the extent of adjustment afforded for plunger 90, any of a large number of fixed precession angles for the train of pulses generated by the over-all circuit of Fig. 2.

Alternatively, a continuous variation of phase may be mechanically obtained with the structure shown in Fig. 2B. This structure resembles that of Fig. 2A except that wave guide 82 of Fig. 2A has been replaced by a slotted guide 82', and instead of piston 92, we have a spoked wheel 92' the spokes 90' of which successively intersect the wave guide through a slot 89 therein. The lower end of wave guide 82' is closed by a closing member 62 and terminated in its characteristic impedance by resistive member 38. The spokes are separated by one-half wavelength as measured in guide 82', and serve to introduce reflections in the guide whose phase depends at any instant on the position of the spoke 90' nearest the junction 36, in the slot 89. It is evident if the wheel is driven at high speed that the phase insertion of this circuit will change rapidly in one direction.

Figure 3B:
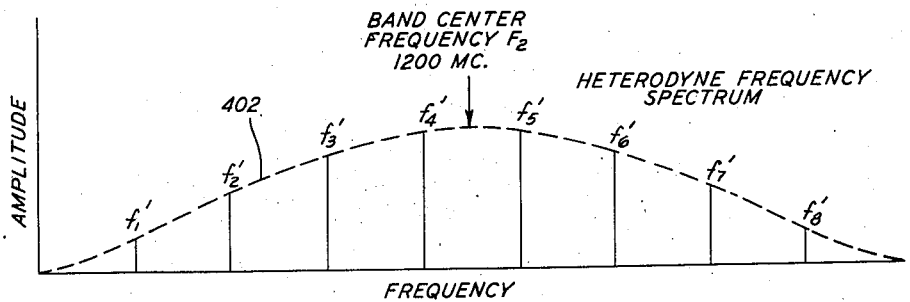
Figure 3C:
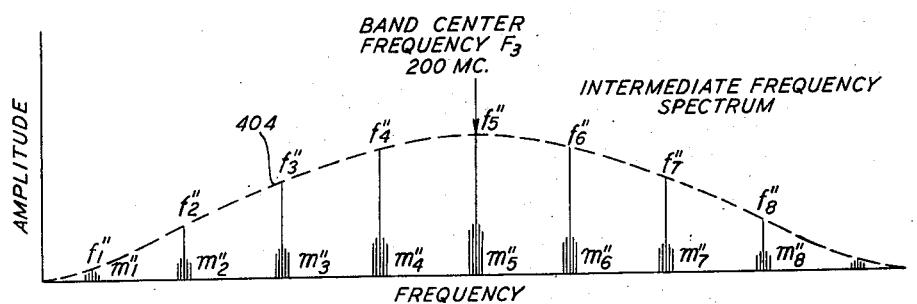

The spectrum diagrams of Figs. 3A, 3B and 3C illustrate certain of the basic concepts underlying the operation of a single channel system of the invention as will be explained in detail below. The apparatus for a single channel system of the invention transmitting pulses of 100 megacycles per second band center frequency is shown in block schematic form in Fig. 5 and will be described in detail hereinafter.

Fig. 3A represents the spectrum of a train of suitably related radio frequency signal pulses having, for example, a convenient "band center frequency" for radio transmission, of 1000 megacycles. Other suitable parameters of the pulse train can be, by way of example, pulse repetition rate 10 million pulses per second, precession angle $\Phi$ of 10 degrees, and pulse length 10 millimicroseconds. As stated hereinabove, each pulse of the train consists of a number of cycles of a specific high frequency and this specific high frequency is the central frequency or "band center frequency" of the frequency spectrum of the train of pulses. Such a pulse train will have a frequency spectrum as indicated in Fig. 3A, in which the spectrum envelope 400 will be in the order of 100 megacycles wide and will be defined by a plurality of frequency lines $f_1$, $f_2$, $f_3$, et cetera, spaced in the order of 10 megacycles apart. In the absence of any modulation, as, for example, during instants in which no modulation is being impressed upon the pulse train, each of these frequency lines will be substantially a single frequency. Modulation of the pulse train, in either amplitude, or phase, or frequency, within limits to be defined hereinafter, will result in the creation of a train of suitably related pulses having a spectrum each frequency line of which will include "sidebands," i.e., bands of frequencies representing the modulation, on each side of each of the above-mentioned frequency lines of the spectrum, indicated in Fig. 3A by the groups of frequencies $m_1$, $m_2$, $m_3$, et cetera centered about their respective corresponding frequency spectrum lines, as shown. In a typical case, these sidebands can be in the order of 1 megacycle wide. These sidebands can comprise, for example, a plurality of carrier telephone signal channels to be transmitted to a distant point over a suitable communication medium such as a radio link.

If at a receiving point a second train of suitably related pulses (designated, for reasons which will presently become obvious, a heterodyne pulse train) is generated, having a convenient heterodyne band center frequency $F_2$ (i.e. each pulse of the heterodyne pulse train consists of a plurality of cycles of the frequency $F_2$), which for the above-assumed value of 1000 megacycles for $F_1$ can be, for example, substantially 1200 megacycles, the heterodyne pulse train will have a spectrum, as shown in Fig. 3B, of which the envelope 402 is defined by the plurality of single pure line frequenciess $f_1'$, $f_2'$, $f_3'$, et cetera. Provided that the pulse length and pulse repetition rate for the train of heterodyne pulses are substantially the same as for the signal pulses from which spectrum 400 of Fig. 3A resulted, the frequency spacing between the pure line frequencies will be the same as for the pure line frequencies $f_1$, $f_2$, $f_3$, et cetera, of Figs. 3A, and each pair of corresponding line frequencies of the two spectra will differ in frequency by the same amount, which can, for example, be 200 megacycles.

By beating the signal frequency pulse train with the heterodyne frequency pulse train, therefore, an intermediate frequency train of pulses having the spectrum shown within the envelope 404, as illustrated in Fig. 3C will be obtained which has a "band center frequency" of substantially $F_2-F_1=200$ megacycles, for the values assumed by way of illustration above. Envelope 404 will be defined by line frequencies $f_1''$, $f_2''$, $f_3''$, et cetera, each of which will be found to have sideband frequencies $m_1''$, $m_2''$, $m_3''$, et cetera corresponding to the modulation products or sidebands of the line frequencies of the signal frequency spectrum shown in Fig. 3A and described above.

Accordingly, any one of the line frequencies of the intermediate frequency spectrum 404, for example, $f_4''$ with its sidebands can be filtered out and rectified to recover the modulation impressed upon the train of signal frequency pulses. For the frequency values of $F_1$ and $F_2$ assumed above, a band-pass filter having a mid-band frequency of 200 megacycles and a band width suitable to pass twice the modulation frequency band (for double sideband operation) will be suitable. For example, for a voice frequency modulation signal having a band of 400 to 4000 cycles, a band width of 8000 cycles would be suitable. Similarly, for signal modulation occupying a frequency range of one megacycle, as mentioned above, a band width of two megacycles would be suitable for double sideband operation.

In actual practice, difficulty would undoubtedly be experienced in maintaining the precise frequencies of 1000 and 1200 megacycles, as mentioned above, so that normal operating deviations could, for example, readily result in small deviations in either or both of the nominal frequencies just mentioned. For example, an intermediate frequency pulse train the spectrum of which had a band center frequency of 205 megacycles would be acceptable in aligning the system, and the above-mentioned bandpass filter would then be adjusted to have a mid-band frequency of 205 megacycles.

Figure 4:
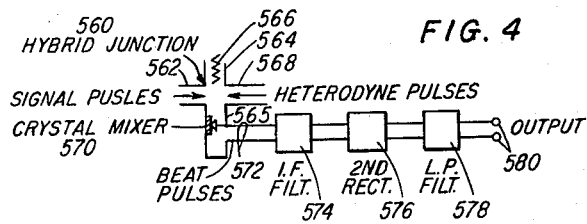
Fig. 4 is an electrical schematic block diagram of the major units in a simple receiving circuit suitable for use in a number of systems of the invention.

In Fig. 4 a simplified block schematic diagram of a type of receiving circuit suitable for use in systems of the invention is shown. In Fig. 4 a hybrid T junction 560 is shown in which one pair of conjugately related arms 562 and 568 are connected, respectively, to the incoming signal pulses and to the source of heterodyne pulses. The other pair of conjugately related arms 564 and 565 contain, respectively, a resistive matching impedance 566 and a crystal mixer 570, as shown. The signal pulses and heterodyne pulses interact in the crystal mixer 570 to provide a train of beat pulses, having a spectrum the "band center" frequency of which is the intermediate frequency corresponding to the difference between the "band center" frequencies of the signal pulse train and the heterodyne pulse train. The intermediate frequency pulses proceed through the transmission line 572 to intermediate frequency filter 574 and thence to a second rectifier 576, the output of which is passed through a second filter (low pass) 578 to obtain at output terminals 580 the modulation products carried by the input signal pulses and impressed by the heterodyning process upon the intermediate frequency pulses.

In Fig. 5, a simple over-all system for intelligence transmission, employing the principles of the invention, is shown. In Fig. 5 a source of modulation 160 which may comprise a voice frequency communication channel having a band of 400 to 4000 cycles, for example, is connected to pulse train generator 162 which is adapted to generate a train of suitably related pulses. The band center frequency for generator 162 can be, for example, $F_1=100$ megacycles and its pulse repetition rate can be 100 kilocycles. The duration of each pulse in the train of pulses from generator 162 can be 100 milli-microseconds. The output of generator 162 is employed to energize radio antenna 164 and a radio wave 165 therefrom is received at a remote point on antenna 166. Antenna 166 is connected to mixer 172, as is also pulse train generator 170 which is also adapted to generate a train of suitably related pulses.

Generator 170 provides the heterodyne pulse train referred to at numerous points above. Its band center frequency in the present instance can be, for example, $F_2=101$ megacycles. It should, of course, have the same pulse repetition rate, i.e., 100 kilocycles, as for generator 162. A connection 168 from antenna 166 to generator 170 is provided in order that the pulse train from generator 170 can be synchronized with the pulse train from generator 162, as received on antenna 166.

The output of mixer 172 is introduced into filter 174 which, in the present instance, can pass a band of frequencies centered about 1 megacycle and having a width in the order of 8000 cycles (assuming double sideband operation).

The output of filter 174 is then passed through rectifier 176 at the output terminal 178 of which the 400 to 4000 cycle modulation originally introduced on the pulse train of generator 162 will be recovered.

Both the signal pulse train from generator 162 and the heterodyne pulse train from generator 170 must be at least substantially suitably related, as described in detail above. Both pulse trains can have variable precession angles provided their variations are identical and are mutually synchronized.

The resulting intermediate frequency pulse train will have a fixed precession angle whether the generators 162 and 170 both have fixed, or variable, precession angles.

In Fig. 6, a more complex system of the invention, illustrating a combination of methods of multiplexing communication channels by use of the principles of the invention, is shown.

In Fig. 6 oscillator 180 can, for example, generate a frequency of 100 megacycles. This frequency is then supplied to a plurality of pulse train generators, represented by generators 182, 182' and 182''. These generators each generate a train of suitably related pulses, the three trains generated by the three generators being identical except that they have different precession angles designated as $\Phi_1$, $\Phi_2$ and $\Phi_3$, respectively, as indicated in Fig. 6.

The output of each generator is supplied to a circuit designated generally by the numeral 186 for generator 182, by 186' for generator 182', and by 186'' for generator 182'', each of these circuits being essentially identical to the others as will subsequently become apparent.

In more detail, circuit 186 comprises a delay line 184 into one end of which the output of generator 182 is introduced. At points spaced along delay line 184, a plurality of modulators 190 to 195, inclusive, are connected. Delay line 184 provides, between each pair of connection points, a delay sufficient to effectively separate, in time, the individual pulses of the pulse train entering each modulator from the corresponding individual pulses of all the other pulse trains entering any of the other modulators of circuit 186, the arrangement obviously representing a form of relatively simple time division multiplexing. Stated in other words, corresponding pulses of the six pulse trains entering modulators 190 to 195, respectively, for example, will occur in succession at time intervals of sufficient length that no pulse will interfere with either the immediately preceding or the immediately following pulse, nor will the pulse from the last modulator 195 interfere with the next successive pulse from modulator 190, etc.

A plurality of modulation sources 200 to 205, inclusive, are connected to the modulators 190 to 195, inclusive, respectively, by means of which, for example, six separate voice frequency messages can be impressed upon the six series or trains of pulses passing through the respective modulators.

The outputs of modulators 190 to 195, inclusive, are all connected to antenna 208 and transmitted by radio to antenna 210 at some remote receiving station.

At the receiving station a suitable plurality of demodulators 220 to 225, inclusive, are connected to antenna 210 and a generator 214 of suitably related pulses is employed to generate a heterodyne train of pulses which, in the present instance, may have a band center frequency of $F_2 = 101$ megacycles.

The pulse repetition rate of generator 214 is, of course, made the same as that of generator 182, i.e., 100 kilocycles.

Generator 214 can be synchronized with the generators 182, 182', and 182" by using the output of one channel, such as the output of receiving circuit 230, to control the pulse repetition frequency of 214 through an automatic frequency control circuit 212, of any of the several conventional forms familiar to those skilled in the art.

The output of generator 214 is introduced into one end of a delay line 218 which can be substantially identical to delay line 184, and demodulators 220 to 225, inclusive, are connected to points along delay line 218, so spaced that the pulse train from generator 214 will in each instance arrive at each demodulator in synchronism with the pulse of a train received on antenna 210 from the corresponding modulator at the transmitting point. For example, the corresponding pulses of the pulse trains from modulators 190 to 195, inclusive, should be timed by delay line 184 so as to arrive successively at demodulators 220 to 225, inclusive, respectively, simultaneously with a pulse from the pulse train from generator 214, as delayed in delay line 218.

The remainder of the receiving circuits 231 to 235, inclusive, are connected to the outputs of demodulators 221 to 225, inclusive, respectively, and can each comprise a filter and a rectifier as indicated in Figs. 4 and 5, as described above.

Returning to the consideration of the transmitting station, pulse train generator 182' can be identical with generator 182 except that the train of pulses generated therein has a different precession angle $\Phi_2$. Its band center frequency and pulsing rate can be the same as for generator 182. Also the circuit 186' can be identical with the circuit 186.

In like manner, pulse train generator 182" can be identical with generators 182 and 182' except that it generates a train of pulses which has a different precession angle $\Phi_3$ and its associated circuit 186" can be identical with the circuits 186 and 186'.

As explained in detail at several points above, since the pulse trains from generators 182, 182' and 182" have different precession angles, they will not mutually interfere with each other since their respective spectra will each comprise a set of frequency lines which will be separated in frequency from the frequency lines of the other sets. At the receiving station, circuits 216' and 216" can be identical with circuit 216, described in detail above, except that the portions of the receiving circuits corresponding to units 230 to 235, inclusive, will be equipped with filters passing a different band of frequencies for each of the three above-mentioned circuits. The use of different precession angles for the several pulse generators therefore results in a species of frequency division multiplexing system.

The over-all system of Fig. 6 is therefore a system employing both time division and frequency division multiplexing.

A still further method of effecting multiplexing, as mentioned briefly above, involves the use of suitably related pulse trains having variable precession angles, the variation of each train's precession angle being distinctively different from all the other trains so that at the receiving station a particular train can be isolated by heterodyning it with a heterodyne pulse train having the same kind of precession angle variation, the precession angle variation of the heterodyne train of pulses being synchronized with that of the particular received train of pulses. The circuit of Fig. 6 can obviously be readily adapted to operate with variable precession angles for each of the generators 182, 182' and 182" by adding at the receiving station, separate heterodyne pulse generators for circuits 216, 216' and 216" which have variable precession angles corresponding to and synchronized with those of generators 182, 182' and 182", respectively. A system embodying this feature in combination with channels employing fixed but different precession angles is shown in Fig. 6A.

In Fig. 6A is shown, as a part thereof, a duplication of the system of Fig. 6 comprising oscillator 180; pulse train generators 182, 182' and 182"; time division multiplexing circuits 186, 186' and 186"; antennas 208 and 210; heterodyne pulse train generator 214; and demodulating circuits 216, 216' and 216", interconnected as shown and described above in connection with Fig. 6. However, in Fig. 6A there has been added a pair of additional duplexing circuits comprising at the transmitter station pulse train generators 682, 682', and associated circuits 686, 686' and at the receiving station, heterodyne pulse train generators 614, 614' and associated demodulating circuits 616 and 616', respectively. Generators 682 and 682' each generate a train of pulses, the pulses in each train being suitably related and having a variable precession angle, the rates of variation being different. Circuits 686 and 686' can be substantially the same as circuits 186, 186', et cetera. Generators 614 and 614' each generate a train of pulses, the pulses in each train being suitably related and having a variable precession angle. The precession angle variations of the pulse trains generated by generators 614 and 614' correspond to those of the pulse trains of generators 682 and 682', respectively. Generators 614 and 614' are synchronized by automatic frequency control circuits operating from channels in their respective receiving circuits as described above for the generator 214 of Fig. 6. In aligning the system for operation, test signals of an appropriate type can be transmitted over selected channels individually in accordance with a predetermined alignment testing schedule until each receiving station heterodyne pulse train generator is properly synchronized with its respective corresponding transmitting station signal pulse train generator.

The system of Fig. 6A is, obviously, as described above, one in which two groups of channels employing different variable precession angles have been added to the three groups of channels employing different fixed precession angles as illustrated in Fig. 6 and described in detail above.

Numerous and varied other circuit arrangements for systems operating within the spirit and scope of the principles of the invention will readily occur to those skilled in the art. The systems described above are merely illustrative. It will be immediately apparent, for example, to those skilled in the art that the principles of the invention are readily applicable to numerous and varied types of radar systems.

What is claimed is:

1. A system comprising means for generating a first train of pulses, each pulse comprising a plurality of cycles of a first high frequency, means for modulating said first train of pulses with a signal wave, means for transmitting and means for receiving said modulated train of pulses, means for generating a second train of pulses, each pulse of said second train comprising a plurality of cycles of a second high frequency different from the first high frequency, means combining said received train of pulses and said second train of pulses for obtaining beat frequencies, and means for utilizing said beat frequencies.

2. A system comprising means for generating a first train of pulses, each pulse comprising a plurality of cycles of a first high frequency, means for transmitting and means for receiving said train of pulses, means for generating a second train of pulses, each pulse of said second train comprising a plurality of cycles of a second high frequency different from the first high frequency, means combining said received train of pulses and said second train of pulses for obtaining beat frequencies, means for utilizing said beat frequencies, and means associated with each of said generating means for changing the phase relation between the high frequency of successive pulses of the respective generated pulse trains.

3. The system of claim 2, in which said phase changing means comprises means for introducing fixed phase changes of the high frequency between successive pulses of the respective pulse trains.

4. The system of claim 2, in which said phase changing means comprises means for introducing progressively varying phase changes of identical character between the high frequency of successive pulses of the respective pulse trains.

5. A system comprising means for generating a plurality of trains of pulses, each pulse comprising a plurality of cycles of a first high frequency, means associated with the generating means for independently controlling the phase relation between the high frequency of successive pulses of each train, means for transmitting and means for receiving said plurality of trains of pulses, said receiving means including means for generating and combining with each received pulse train, respectively, a heterodyning pulse train each of the pulses of which comprises a plurality of cycles of a second high frequency different from the first high frequency, said last mentioned generating means including means for controlling the phase relation between the high frequency of successive pulses of said heterodyning pulse train, and means for severally utilizing the beat frequencies resulting from the respective combinations of each received pulse train and its associated heterodyne pulse train.

6. The system of claim 5 and independent means for modulating each of said first plurality of pulse trains by a signal.

7. The system of claim 5 in which the phase changing means associated with said first generating means comprises means for imparting a phase relation between the high frequency of successive pulses of each train which is constant throughout the train and differs from the corresponding phase relation as it exists in each of the other of said trains of pulses.

8. The system of claim 5 in which the phase changing means associated with said first generating means comprises means for imparting a phase relation between the high frequency of successive pulses of each train which changes progressively throughout the train, the progressive change for each of said first plurality of trains differing from the progressive change in each of the other of said first plurality of trains.

References Cited in the file of this patent
UNITED STATES PATENTS

| | | |
|---|---|---|
| 2,457,986 | Edson | Jan. 4, 1949 |
| 2,478,919 | Hansell | Aug. 16, 1949 |
| 2,482,128 | Schmid | Sept. 20, 1949 |
| 2,508,620 | Peterson | May 23, 1950 |
| 2,512,530 | O'Brien et al. | June 20, 1950 |
| 2,525,328 | Wolff | Oct. 10, 1950 |
| 2,553,018 | Strafford | May 15, 1951 |
| 2,555,121 | Emslie | May 29, 1951 |
| 2,570,207 | Chatterjea | Oct. 9, 1951 |
| 2,576,963 | Newsom | Dec. 4, 1951 |
| 2,617,983 | Emslie | Nov. 11, 1952 |

OTHER REFERENCES

"Principles of Radar," MIT Radar School Staff, 2nd Ed., McGraw-Hill Book Co., pp. 4–12 to 4–24.